United States Patent [19]

Craig

[11] Patent Number: 4,634,458

[45] Date of Patent: Jan. 6, 1987

[54] DOUBLE-STAGE AIR FILTER

[75] Inventor: W. Dale Craig, Dahlgren, Va.

[73] Assignee: The United States of America as represented by the Secretary of the Navy, Washington, D.C.

[21] Appl. No.: 827,589

[22] Filed: Feb. 10, 1986

[51] Int. Cl.⁴ .............................................. B01D 50/00

[52] U.S. Cl. ......................................... 55/316; 55/350; 55/387; 55/482; 55/484; 55/498; 210/315

[58] Field of Search ................. 55/316, 484, 350, 418, 55/410, 486, 487, 387, 482, 498, 502; 210/315

[56] References Cited

U.S. PATENT DOCUMENTS

| | | | |
|---|---|---|---|
| 2,145,049 | 1/1939 | Heuberger | 183/49 |
| 3,252,270 | 5/1966 | Pall et al. | 55/74 |
| 4,322,230 | 5/1982 | Schoen et al. | 55/316 |
| 4,339,250 | 7/1982 | Thut | 55/316 |
| 4,477,270 | 10/1984 | Tauch | 55/316 |
| 4,559,138 | 12/1985 | Harms | 55/502 |

FOREIGN PATENT DOCUMENTS

| | | | |
|---|---|---|---|
| 624442 | 5/1963 | Belgium | 55/482 |
| 1619863 | 8/1970 | Fed. Rep. of Germany | 55/316 |

*Primary Examiner*—Bernard Nozick

*Attorney, Agent, or Firm*—Elmer E. Goshorn; Thomas E. McDonnell

[57] ABSTRACT

Improved double-stage air filter of modular construction for attachment between aligned openings of a spaced double wall structure in order to supply filtered air flow to a controlled area. The filter is generally made up of casing means and combined plate and sleeve means. Both the casing means and plate means are provided with a flange means. The sleeve means is provided with a series of perforations and the plate means flange means is provided with a plurality of relatively spaced slots. The casing means flange means is affixed to the outer wall so that the casing means extends between the walls. The plate means includes retainer means that is affixed to the inner wall so that the sleeve means is inserted in the casing means. Inner and outer filter means for cleaning and purifying an air flow are disposed about the sleeve means. Retainer means are connected to the casing means flange means so as to hold the filter means in sealing engagement between the last mentioned retainer means and the plate means. During use of the filter, an airflow to be filtered is directed through the sleeve perforations, the filter means, and the slots of the plate means flange means thereby supplying filtered air to the controlled area. Depending on the filtered air flow requirements of a controlled area, one or more filters of the invention can be arranged in any suitable arrayed configuration in relation to the walled structure. Whenever a filter needs to be serviced the plate means retainer means is temporarily covered thereby preventing the entrance of unfiltered air to the controlled area. One of the advantages of the double-stage air filter is that it not only removes particles from an air flow, but also purifies same from the toxic effects of chemical, biological, radiological agents, or any combination thereof.

26 Claims, 9 Drawing Figures

DOUBLE-STAGE AIR FILTER

This invention concerns a double-stage air filter for both cleaning and purifying an air flow, and more particularly, it relates to an improved double-stage air filter of modular construction for both cleaning and purifying an air flow and which can be used in single or multiple arrayed fashion in meeting the filtered air flow requirements of a controlled area.

BACKGROUND OF THE INVENTION

Various air filters have been designed in the past for cleaning, purifying or both, a volume of air. For example, U.S. Pat. No. 2,145,049 to Heuberger relates to an air purifier. The species of FIG. 4 is considered pertinent and is generally made up of a series of concentric filter elements of similar or dissimilar material in tandem relationship. The filter elements are supported by a housing. A motor driven fan is connected to one end of the housing for generating an air flow to be purified through the filters. U.S. Pat. No. 3,252,270 to Pall et al. discloses a double-stage oil filter for attachment to a pipeline arrangement. The single housing configuration of the filter in FIG. 1 is considered pertinent. U.S. Pat. No. 4,322,230 to Schoen et al. concerns a double-stage disposable air filter of unitized construction. The filter housing is provided with capped inlet and outlet ports until the filter is connected to a pipeline arrangement for filtering an air flow. U.S. Pat. No. 4,477,270 to Tauch discloses a portable three-stage air filter of cylindrical-shaped configuration for attachment to a cabinet housing in some fashion. The filter is generally comprised of a series of three concentric filter elements, the inner element being composed of densified carbon particles and two outer polyurethane foam shells. U.S. Pat. No. 4,339,250 to Thut relates to a self-contained, floor-disposed three-stage air filter of cylindrical shape for progressively cleaning and purifying an enclosed air space. The filter is generally made up of an outer filter element of cloth material, an intermediate filter element of fiberglass, and an inner filter element of activated granular carbon of a predetermined density. However, none of the aforediscussed references, whether taken alone or in any combination, remotely suggest an improved double-stage air filter for attachment between a spaced double wall structure in single or multiple arrayed fashion in meeting the filtered air requirements of a controlled area. The filter is provided with a casing extending between aligned openings in the walls and attached to the inlet wall of the wall structure. A combined plate and perforated sleeve arrangement is inserted in the casing and connected to the outlet wall of the structure. A concentric inner and outer filter arrangement is disposed about the sleeve within the casing so as to provide a unique and efficient air flow filtration path from the sleeve interior adjacent the outer wall inlet opening through the filter arrangement and the novel slot means of the plate means to the inner wall outlet opening so as to provide a cleaned and purified air flow to the controlled area.

SUMMARY OF THE INVENTION

An object of the invention is to provide an improved double-stage air filter for purifying and cleaning an air flow in meeting the non-contaminated air requirements of a controlled area.

Another object of the invention is to provide an improved double-stage air filter for purifying and cleaning an air flow by being readily insertable and attachable to a spaced double wall structure in single or multiple arrayed fashion so as to meet the non-contaminated air requirements of a controlled area.

Still another object of the invention is to provide an improved double-stage air filter where the filter can be temporarily closed off so as to prevent contamination of a controlled area whenever the filter requires servicing or maintenance such as replacement of a used filter element.

Yet another object of the invention is to provide an improved double-stage air filter of modular and simple construction that can be readily attached to a spaced double wall structure for positively separating a contaminated area from a controlled area.

In summary, the improved double-stage air filter of the invention for supplying purified and cleaned air to a controlled area is generally made up of casing means and combined plate and sleeve means. Both the casing means and the plate means are provided with flange means. The casing means flange means is connected to the outer wall of a spaced double-wall structure so that the casing means extends between the aligned openings of the walls of the structure. A retainer means is connected to the plate means flange means in order that the sleeve means can be inserted through the opening in the inner wall and disposed in the casing means.

An inner and outer concentric filter arrangement is inserted through the opening in the outer wall and disposed about the sleeve means and against the plate means. Depending upon air handling requirements for a filter, the filter arrangement is normally made up of more than one inner filter section and more than one outer filter section. Adjoining inner and outer filter sections when they are disposed about the sleeve means are arranged in abutting relation to each other. The inner filter removes particulate material from an air flow to be filtered, and thus is usually constructed of a suitable grade of coarse and fine porous filter paper. The outer filter absorbs gaseous products from the air flow that are objectionable from a chemical, biological or radiological standpoint, and thus is usually constructed of a suitable grade of activated granular carbon material. Retainer means are connected to the casing means flange means so as to provide sealing engagement between the casing means flange means and the filter arrangement, and between the filter arrangement and the plate means. The plate means flange means is provided with a series of relatively spaced slots. The slots are arranged about the outer periphery of the plate means flange means such that the slots are in direct open communication between the inner wall opening and the chamber between the casing means and the filter arrangement.

Depending on the filtered air requirements of a controlled area, one or more filters of the invention are mounted in aligned openings of a spaced double wall structure in single or any suitable multiple arrayed fashion. Whenever maintenance or servicing of a filter is required, the plate means retainer means is covered by an attachable plate thereby temporarily closing off the filter from the controlled area. One of the reasons for closing off the filter is usually for replacing used filters. In order to maintain the various components of a filter in proper assembled relation throughout normal use of the filter, appropriate reinforcing elements can be provided between the inner and outer walls of the wall structure.

Other objects and advantages of the invention will become apparent when taken in conjunction with the accompanying drawings and specification. C

DETAILED DESCRIPTION OF THE INVENTION

Figure 1:
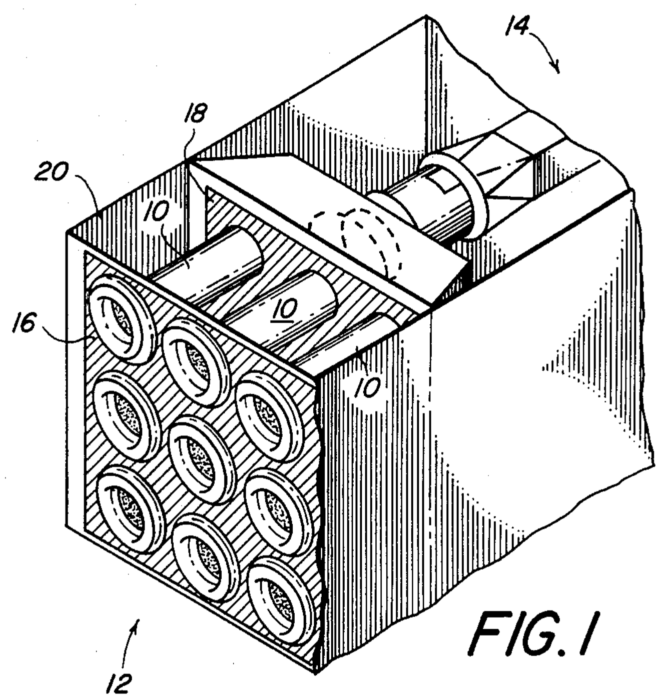
FIG. 1 is a fragmented perspective view of an embodiment of an improved arrayed filter system for purifying and cleaning separate air flows prior to entry of the filtered air flows into a controlled area wherein the system incorporates a series of improved double-stage air filters.

With further reference to FIG. 1, an arrayed configuration of a series of air filters 10 are interposed between an inlet area 12 and a controlled area 14 and advantageously function to supply cleaned and purified air flow to area 14. Each filter is mounted in spaced walls 16 and 18 of a double wall structure 20. If more than on filter 10 is required to meet the cleaned air requirements of a controlled area, any series of filters 10 can be arrayed in a suitable relatively spaced configuration such as the (9) filters of FIG. 1, the four (4) filters of FIG. 2A, the eight (8) filters of FIG. 2B, etc.

Figure 3:
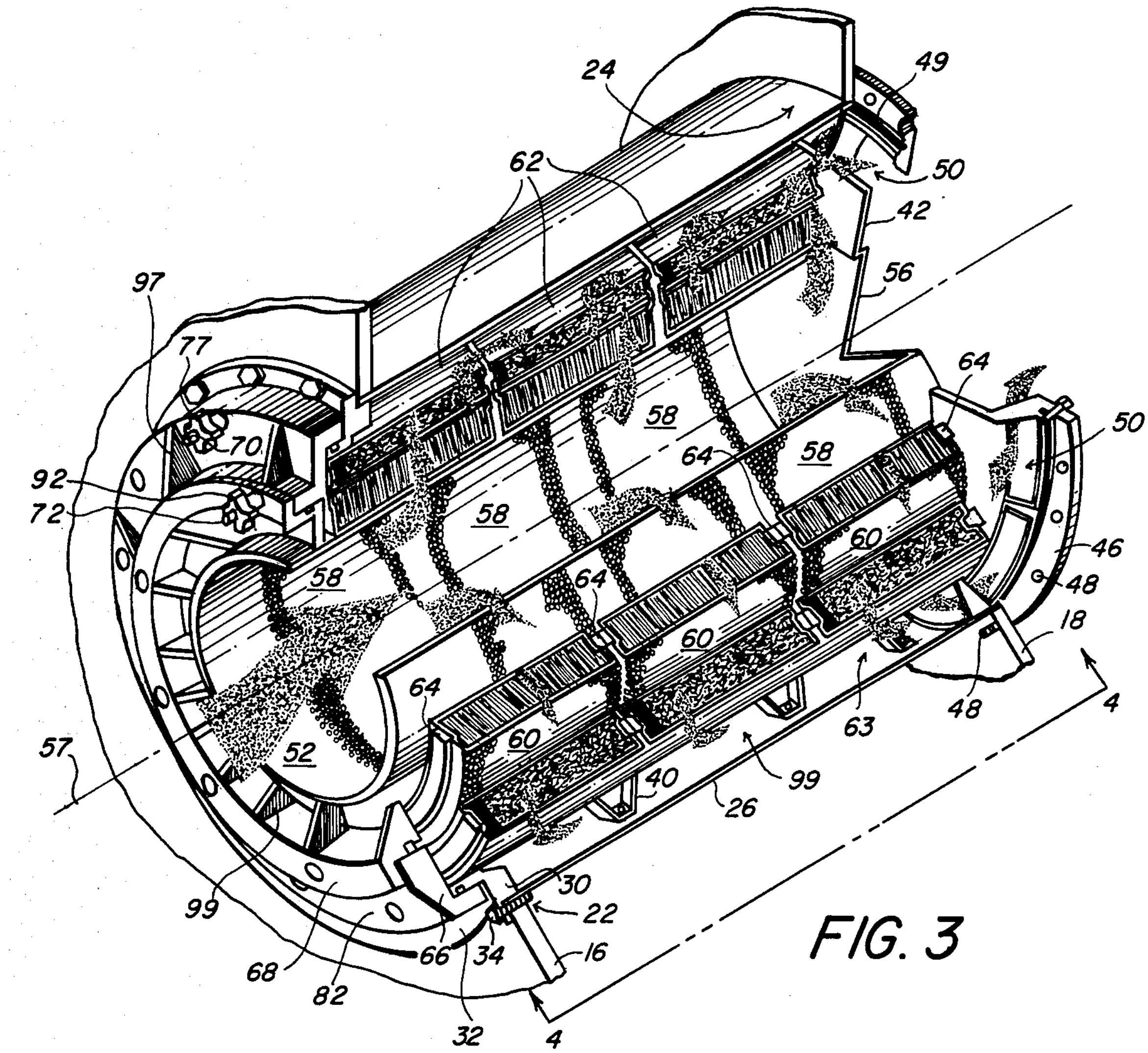
FIG. 3 is an enlarged fragmented perspective view of an improved filter of the invention as incorporated in the system of FIG. 1.
Figure 4:
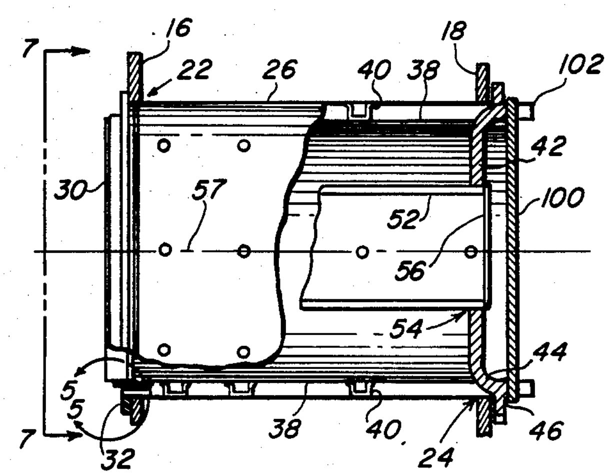
FIG. 4 is a reduced elevation view as taken along line 4—4 of 3 with parts added, parts removed and other parts broken away, and illustrates further details of the invention.
Figure 5:
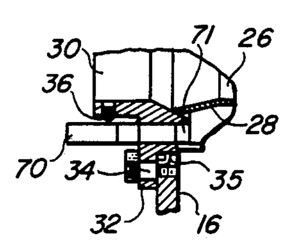
FIG. 5 is an enlarged sectional view within the bounds of encompassing line 5—5 of FIG. 4.
Figure 6:
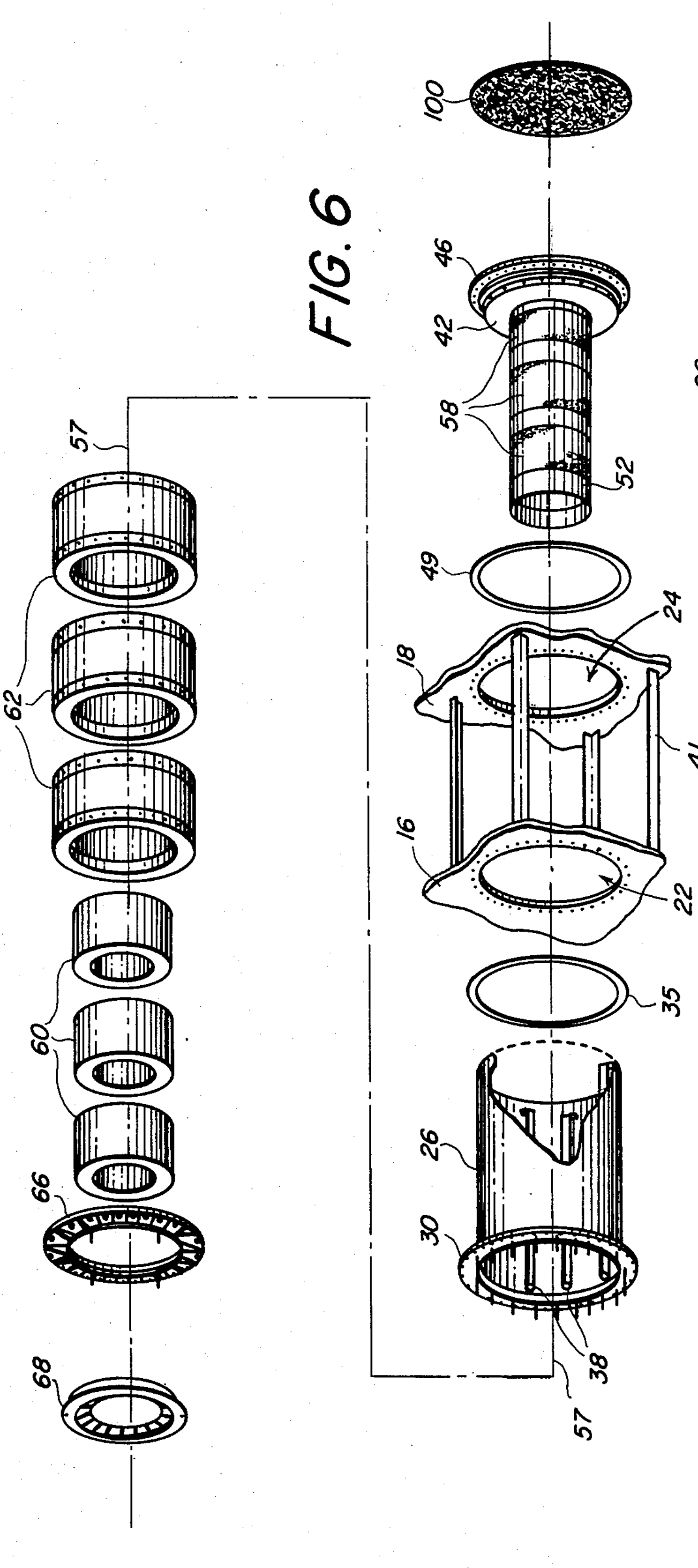
FIG. 6 is a combined perspective and exploded assembly view of a filter of the invention with parts removed and other parts broken away and illustrates the relationship of various components of the filter prior to mounting the filter between spaced walls of the system of FIG. 1.

As illustrated in FIG. 3, each filter 10 is mounted in longitudinally aligned apertures 22 and 24 of spaced walls 16 and 18. A filter 10 is provided with a casing 26 of suitable sheet metal material. One end 28 of casing 26 is flared radially outward throughout its periphery as best depicted in FIG. 5. A flange 30 of annular shape is suitably affixed to flared end 28 of casing 26. The outer periphery of flange 30 is provided with an annular rib 32 for facilitating attachment of the flange to wall 16 about opening 22 by a series of cap screws 34 through aligned openings as best depicted in FIG. 5. An o-ring 35 is interposed between rib 32 and wall 16. The outer annular surface of flange 32 at its outer end is provided with an annular groove for receiving an o-ring 36. Casing 26 is of such a length that when flange 30 is affixed to wall 16 as aforedescribed, the opposed and flange-free end of the casing is inserted in aperture 24 of wall 18 as shown in FIG. 4. A series of longitudinally extending strips 38 are affixed to the interior surface of casing 26 and are arranged in parallel and equally spaced relation to each other about the casing periphery. Each strip 38 is affixed to casing 26 by a plurality of longitudinally or axially spaced U-shaped mounting brackets 40. For the sake of brevity, only two strips 38 are depicted in FIG. 4, and the purpose of these will become more apparent hereinafter. A plurality of four relatively spaced angle-shaped reinforcing elements 41 are interposed between and connected to walls 16 and 18 as well as circumferentially disposed about and spaced radially outwardly from casing 26 so as to maintain spacing between walls 16 and 18 and thus assure efficient use of filter 10 throughout its normal use as depicted in FIG. 6.

A disc-like plate element 42 at its outer periphery is provided with a longitudinally extending rearward flange 44 of annular shape. The outer end of flange 44 is integrally connected to an annular-shaped retainer 46. The maximum outside diameter of flange 44 is substantially equal to the inside diameter of casing 26. A corresponding plurality of equally spaced and alignable openings 48 are provided in both walls 18 and retainer 46 in order that a plurality of cap screws (not shown) can be connected to aligned openings 48 in wall 18 and retainer 46 so as to firmly secure plate 42 to wall 18 as best shown in FIG. 3. An o-ring 49 is mounted in an annular groove in the outer periphery of flange 44 so as to provide a seal between flange 44 and the interior surface of casing 26 at its flange-free end when plate 42 is secured to wall 18. A plurality of equally spaced and circumferentially elongated slots 50 are provided in flange 44. The purpose of these slots 50 will become more apparent hereinafter.

One end of a sleeve 52 is inserted in a concentric aperture 54 of plate 42 and suitably affixed thereto. A disc-like plate 56 is affixed to the one end of sleeve 52 and thus closes off same. When sleeve 52 is affixed to plate 42 and retainer 46 affixed to wall 18, the sleeve is concentrically disposed in relation to filter axis 57 and casing 26. Sleeve 52, between its ends, is provided with a series of three longitudinally spaced patterned perforations 58 about its periphery. Sleeve 52 has a length when connected to plate 52 such that its outer free end extends beyond outer wall 16 as illustrated in FIG. 3.

A plurality of three sets of concentric inner and outer double-stage filters 60 and 62 are disposed about sleeve 52 so as to provide a reduced chamber 63 between flanges 30 and 44 and between the outer periphery of three outer filters 62 and the inner periphery of casing 26. Each inner filter 60 is made up of an inner core of appropriate fine and coarse porous paper construction so as to effectively remove particles from a flow of air to be filtered passing therethrough. The particles removed by a filter are on the order of from three-tenths (0.3) of a micron to three (3.0) microns in size. Each outer filter 62 is composed of an inner core of a preselected densified mass of activated carbon material of predetermined granular size. The carbon material functions as a sorbent and has been found to remove up to ninetynine percent (99%) of toxic gaseous impurities from an air flow to be purified where the gaseous impurities removed are chemical, biological or radiological toxic agents. As evident from FIG. 3, either filter 60 or 62 is preferably of unitized sheet-mctal construction; and, in radial cross section, is of box-like configuration. The inner and outer peripheral walls of either filter 60 or 62 are provided with a suitable mesh size for passing an air flow to be filtered through the core thereof. The opposed end walls of the box-like construction of either filter 60 or 62 are provided with annular flat-shaped seal rings of suitable impervious and compressible material as best shown in FIG. 3. By reason of sleeve 52 having an outside diameter substantially corresponding to the inside diameter of an inner filter 60, a series of more than one set of inner and outer filters 60 and 62 can be inserted over the outer end of sleeve 62 adJacent wall 16 so as to be concentrically and primarily supported by the sleeve throughout normal use of filter 10. Since rib 38 is disposed radially inward from casing 26 at a distance substantially equal to the outside diameter of outer filter 62, and set of filters 60 and 62 about sleeve 52 are supported in some degree by one or fore ribs in maintaining filters 60 and 62 in concentric relation to filter axis 57.

Figure 8:
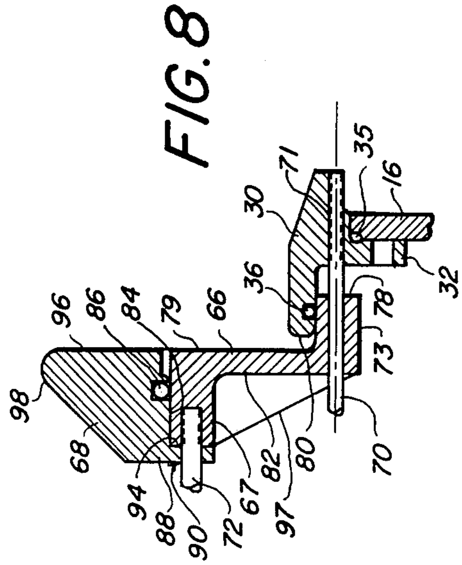
FIG. 8 is an enlarged cross-sectional view with parts added as taken along line 8—8 of FIG. 7.
Figure 7:
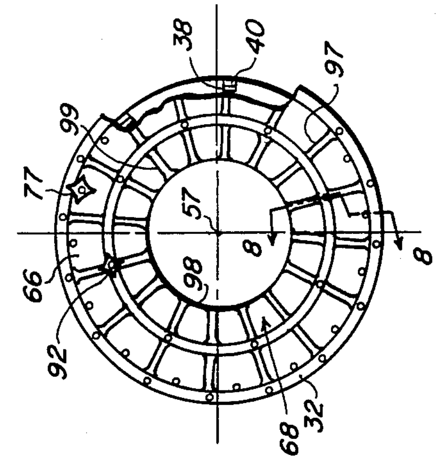
FIG. 7 is a fragmented end view of the inlet end of a filter of the invention as taken along line 7—7 of FIG. 4.

Outer and inner concentric retainer rings 66 and 68 are connected to casing flange 30 as illustrated if FIG. 3. Flange 30 is provided with a series of sixteen (16) circumferentially and equally spaced threaded openings for receiving a plurality of sixteen (16) threaded studs 70 as best shown in FIG. 8. Each stud 70 is suitably affixed to flange 30 after being inserted in its respective opening 71. Outer ring 66 is of approximate Z-shaped configuration in radial cross-section. Hub portion 67 of ring 66 is provided with a series of circumferentially and equally spaced eight (8) threaded openings for receiving a plurality of eight (8) studs 72. The internal peripheral surface of rearwardly extending annular rib 73 of ring 66 has a diameter substantially equal to the diameter of the outer peripheral surface of the forwardly extending annular rib of flange 30.

In assembling ring 66 to flange 30, a series of sixteen (16) circumferentially and equally spaced openings are provided that are radially and circumferentialy alignable with the series of sixteen (16) studs 70 so that ring 66 is initially loosely connected to flange 30 as shown in FIG. 8. A plurality of sixteen (16) nuts 77 of star-shaped configuration are threadedly connected to the series of studs. The depth between inner end face 79 of ring 66 and end face 78 of rib 73 is such that end face 79 will be drawn into pressured sealing engagement with adjoining seal 64 of the immediately adjacent outer filter 62 prior to end face 79 abutting outer rib end face 80 of flange 30 when all nuts 77 of the plurality thereof are threadedly connected to their associated studs 70 and drawn securely against outer peripheral portions of end face 82 of ring 66. In other words, the depth between end faces 79 and 78 of ring 66 is such that end face 79 will forcibly and sealably engage adjoining outer seal 64 of the immediately adjacent outer filter 62 in such fashion that all seals 64 of the series of three outer filters 62 will be in airtight seal engagement between adjoining filters 62 and 62, between plate 42 and innermost filter 62, and between ring end face 79 and outermost filter 62 as best shown in FIG. 3.

Outer annular surface 84 of inner ring 68 has a diameter substantially equal to the diameter of the interior annular surface of hub portion 67 of outer ring 66. Surface 84 is provided with an annular groove for receiving an o-ring 86. Outer annular rib portion 88 of ring 68 is provided with a series of eight (8) circumferentially and equally spaced openings 90 that are radially and circumferentially aligned with the series of studs 72 so that ring 68 can be initially loosely assembled to ring 66 as depicted in FIG. 8. A plurality of eight (8) nuts 92 of star-shaped configuration are threadedly connected to the outer ends of their associated studs 72 so as to draw the rib portion inner end face 94 of ring 68 into abutting engagement with the outer end face of ring 66, thereby securely and concentrically connecting ring 68 to outer ring 66. The depth between the inner end face 96 of ring 68 and rib portion inner end face 94 is such that the rib portion inner end face 94 of ring 68 abuts the outer end face of outer ring 66 while at the same time end face 96 of ring 68 forcibly and sealably engages the adjoining seal 64 of the immediately adjacent inner filter 60, all when ring 68 is securely connected to outer ring as best shown in FIG. 3. Further, this engagement is such that seals 64 of all filters 60 of the series of three inner filters 60 are in sealing engagement between adjoining filters 60 and 60, between plate 42 and innermost filter 60, and between ring end face 96 and outermost inner filter 60. The inner annular surface 98 of ring 68 has a curvilinear profile in axial section as illustrated in FIG. 8. Surface 98 has an inner diameter at its outer end thereof that substantially equals the outer diameter of sleeve 52 so that ring 68 freely and slidably engages the outer surface of sleeve 52 at its outer end when ring 68 is assembled and secured to outer ring 66. It is noted here that both rings 66 and 68 are provided with separate series of radially aligned and equally spaced reinforcing ribs 97 and 99. These ribs serve to maintain end faces 79 and 96 in planar alignment throughout their periphery, thereby maintaining the seal engagement between adjoining filters 60 and 60, 62 and 62; rings 66 and 68; ring 66 and flange 30; plate 42 and innermost filters 60 and 62; and outermost filters 60 and 62 and rings 68 and 66.

By reason of the sealing interengagement of filters 60 and 62 between plate 42 and rings 66 and 68 together with the o-ring seals 36 and 86 between flange 30 and ring 66 and between rings 66 and 68 along with o-ring seals 35 and 49 between flange rib 32 and wall 16 and between retainer 46 and wall 18, an air-tight omnidirectional and relatively unobstructed filter-flow path is defined by filter 10 in a direction from its inlet end adjacent contaminated area 12, through interior of sleeve 52, perforations 58, filters 60 and 62, chamber 63 and slots 50 to controlled area 14 as indicated by the series of arrows in FIG. 3. Whenever any filter 60 or 62 becomes expended as result of removing particles or pollutants, a circular disc 100 is selectively connected to the outer end face of flange 44 by a series of an appropriate number of cap screws 102 (only two of which are shown in FIG. 4) thereby temporarily closing off filter 10 until the filters are replaced or the filter is otherwise serviced. It is noted here that by reason of reinforcing strips 41 between walls 16 and 18, each filter 10 was able to effectively clean and purify a flow of air therethrough without any noticeable leakage of unfiltered air from contaminated area 12 to controlled area 16. Moreover, the construction of filter 10 of this invention is able to withstand shock loads in accordance with Military Specification, MIL-S-901C (NAVY) that is required to be met before any equipment is used aboard a Naval vessel.

Figure 2A:
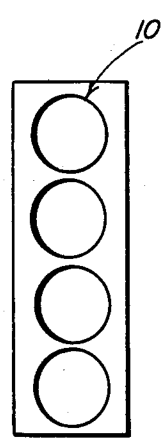
FIGS. 2A and 2B are schematic views that illustrate other embodiments of arrayed configurations of the filter system for purifying and cleaning an air flow for a controlled area.
Figure 2B:
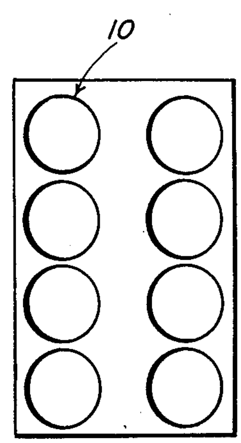

One of the advantages of arrayed filters 10 of FIGS. 1, 2A or 2B is that one or more filters can be temporarily shut off by disc cover 100 while other filters 10 of the array remain operative in order to meet at least the minimum requirements of cleaned and purified air for controlled area 14. By reason of star-configured nuts 77 and 92 for assembling/disassembling rings 66 and 68, each filter can readily be serviced in simple and manual fashion all without adversely affecting efficient operation of a filter when it is reused.

Obviously, many modifications and variations of the present invention are possible in light of the above teachings. It is, therefore, to be understood that, within the scope of the appended claims, the invention may be practiced otherwise than as specifically described.

What is claimed is:

1. A double-stage air filter apparatus of modular construction for purifying and cleaning air between an inlet area and a controlled area, said apparatus comprising:

a double wall structure separating the areas with one of the walls being an outer wall exposed to the inlet area and the other wall being the inner wall exposed to the controlled area as well as spaced from the outer wall, the walls of said structure including longitudinally aligned apertures therein, an air filter provided in said structure and generally comprising casing means and combined plate and sleeve means, the casing means extending between the apertures of the inner and outer walls and having flange means affixed to the outer wall about the aperture thereof so that the hollow interior of the casing means defines an opening between the inner and outer walls that is separated from and not in communication with the space between the walls of said structure, the sleeve means of the combined plate and sleeve means being of smaller diameter than the casing means and being provided with a patterned series of perforation means between its ends, the plate means of the combined plate and sleeve means being provided with flange means having a series of relatively spaced slot means, the series of slot means being disposed about the flange means outer periphery, the plate means also being provided with retainer means connected to said flange means, the flange means being interposed between the outer periphery of said plate means and the retainer means.

the retainer means being affixed to the inner wall about its aperture such that the sleeve means and the plate flange means are inserted in the interior of the casing means, the sleeve means being of such a length that the outer end of the sleeve means extends to the outer wall aperture, the outer periphery of the plate flange means having a diameter substantially equal to the inside diameter of the casing means while the outside diameter of the sleeve means is substantially less than the inside diameter of the casing means, inner and outer filter means of annular shape disposed about the sleeve means so as to cover the series of perforation means while at the same time being disposed against the plate means, the filter means being of a length substantially corresponding to the length of the sleeve means, the outside diameter of the outer filter means being less than the inside diameter of the casing means so as to define a chamber between the filter means and the casing means and between the plate flange means and the outer wall, the series of slot means of the flange means being in direct open communication with the chamber and the controlled area, opposed inner and outer end faces of the filter means having seal means, and second retainer means of annular shape affixed to the casing means flange means so as to be in sealing and pressured engagement with the seal means at the outer end face of the filter means and at the same time forcibly urging the seal means at the inner end face of the filter means into sealing engagement with the plate means and the second retainer means also closing off the chamber at the outer wall so as to define an air flow purifying and cleaning path from the inlet area through the interior of the sleeve means, the series of perforation means, the filter means, and the chamber to the slot means so as to furnish an uninterrupted flow of filtered air to the controlled area.

2. An apparatus as set forth in claim 1 wherein said inner filter means is of selected porous construction for removing particulate materials from a given air flow during apparatus use.

3. An apparatus as set forth in claim 1 wherein said outer filter means is made up of a suitable sorbent material for purifying a given air flow during apparatus use.

4. An apparatus as set forth in claim 1 wherein the inner filter means is comprised of a series of inner filter means and wherein the outer filter means is comprised of a second series of outer filter means.

5. An apparatus as set forth in claim 1 wherein the inner filter means is made up of at least one suitable grade of filter paper material.

6. An apparatus as set forth in claim 1 wherein the inner periphery of the second retainer means is disposed in supporting engagement with the outer end of the sleeve means.

7. An apparatus as set forth in claim 1 wherein o-ring seals are provided between the outer wall and the casing means flange means and between the inner wall and the plate means retainer means.

8. An apparatus as set forth in claim 1 wherein the inner end of the sleeve means is closed off so as to prevent any air flow directly between the sleeve interior and the controlled area.

9. An apparatus as set forth in claim 1 wherein cover means are selectively affixed to the plate means retainer means so as to temporarily close off filtered air flow between the slot means and the controlled area.

10. An apparatus as set forth in claim 1, wherein the inner periphery of the casing means is provided with a series of longitudinally extending and circumferentially spaced ribs, the ribs for guiding and supporting the outer periphery of the outer filter means when the filter means is being removed from or inserted about the sleeve means.

11. An apparatus as set forth in claim 1 wherein reinforcing means are provided between the inner and outer walls so as to maintain the spacing between the walls.

12. An apparatus as set forth in claim 1 wherein the second retainer means includes means for selectively removing same from said casing means flange means.

13. An apparatus as set forth in claim 1 wherein the second retainer means is comprised of inner and outer interconnected elements of annular shape, the inner element being in sealing engagement with the seal means at the outer end face of the inner filter means while the outer element is in sealing engagement with the seal means at the outer end face of the outer filter means.

14. An apparatus as set forth in claim 13 wherein o-ring seals are provided between the inner and outer elements and between the outer element and the casing means flange means.

15. An air filter apparatus made up of an arrayed configuration of a series of relatively-spaced double-stage air filters of modular construction that are interposed between an inlet area and a controlled area in order to meet the filtered air flow requirements of the controlled area, said apparatus comprising:

a double wall structure separating the areas with one of the walls being an outer wall exposed to the inlet area and the other wall being the inner wall exposed to the controlled area as well as spaced from the outer wall, the walls of said structure being provided with opposed first and second series of relatively spaced apertures therein, a series of relatively spaced double-stage air filters, each one of the filters of the series being operatively associated with their respective opposed and longitudinally aligned apertures of the opposed first and second series of apertures, each filter being generally comprised of casing means and combined plate and sleeve means, the casing means extending between the opposed and aligned apertures of the inner and outer walls and having flange means affixed to the outer wall about the associated aperture thereof so that the hollow interior of the casing means defines an opening between the ends thereof that is separated from and not in communication with the space between the walls of said structure, the sleeve means of the combined plate and sleeve means being of smaller diameter than the casing means and having a patterned series of perforation means between its ends, the plate means of the combined plate and sleeve means being provided with flange means having a series of relatively spaced slot means, the series of slot means being the outer periphery of the plate flange means, the plate means also being provided with retainer means connected to said flange means, the flange means being interposed between the outer periphery of said plate means and the retainer means, the plate means retainer means being affixed to the inner wall about its associated aperture such that the sleeve means and the plate flange means are inserted in the interior of the associated casing means, the sleeve means being of such a length that the outer end of the sleeve means extends to the associated outer wall aperture, the outer periphery of the plate flange means having a diameter substantially equal to the inside diameter of the casing means while the outside diameter of the sleeve means is substantially less than the inside diameter of the casing means, inner and outer filter means of annular shape disposed about the sleeve means of each filter so as to cover the series of perforation means while at the same time being disposed against the plate means, the filter means being of a length substantially corresponding to the length of the sleeve means, the outside diameter of the outer filter means being less than the inside diameter of the casing means so as to define a chamber between the filter means and the casing means and between the outer wall and the plate flange means, the series of slot means of the flange means being in direct open communication with the chamber and the controlled area, opposed inner and outer end faces of the filter means having seal means, and second retainer means of annular shape affixed to the casing means flange means of each filter so as to be in sealing and pressured engagement with the seal means at the outer end face of the filter means and at the same time forcibly urging the seal means at the inner end face of the filter means into sealing engagement with the plate means and the second retainer means also closing off the chamber at the outer wall so that each filter defines an air flow purifying and cleaning path from the inlet area through the interior of its sleeve means, the series of perforation means, the filter means, and the chamber to the slot means in order that the series of arrayed filters meet the filtered air flow requirements of the controlled area.

16. An apparatus as set forth in claim 15 wherein said inner filter means of each filter is of selected porous construction for removing particulate materials from a given air flow during apparatus use.

17. An apparatus as set forth in claim 15 wherein said outer filter means of each filter is made up of a suitable sorbent material for purifying a given air flow during apparatus use.

18. An apparatus as set forth in claim 15 wherein the inner filter means of each filter is comprised of a series of inner filter means, and wherein the outer filter means of each filter is comprised of another series of filter means.

19. An apparatus as set forth in claim 15 wherein the inner filter means of each filter is made up of at least one suitable grade of filter paper material.

20. An apparatus as set forth in claim 15 wherein the inner periphery of the second retainer means of each filter is disposed in supporting engagement with the outer end of the sleeve means thereof.

21. An apparatus as set forth in claim 15 wherein o-ring seals are provided between the outer wall and the casing means flange means and between the inner wall and the plate means retainer means.

22. An apparatus as set forth in claim 15 wherein the inner end of the sleeve means of each filter is closed off so as to prevent any air flow directly between the sleeve interior and the controlled area.

23. An apparatus as set forth in claim 15 wherein cover means are selectively affixed to the plate means retainer means of each filter so as to temporarily close off filtered air flow communication between the slot means and the controlled area of a given filter.

24. An apparatus as set forth in claim 15, wherein the inner periphery of the casing means of each filter is provided with a series of longitudinally extending and circumferentially spaced ribs, the ribs of each filter for guiding and supporting the outer periphery of the outer filter means thereof when the filter means of a filter is being removed from or inserted about the sleeve means thereof.

25. An apparatus as set forth in claim 15 wherein the second retainer means of each filter is comprised of inner and outer interconnected elements of annular shape, the inner element being disposed in sealing engagement with the seal means at the outer end face of the inner filter means while the outer element is disposed in sealing engagement with the seal means at the outer end face of the outer filter.

26. An apparatus as set forth in claim 25 wherein o-ring seals are provided between the inner and outer elements and between the outer element and the casing means flange means.

* * * * *